Figure 7:
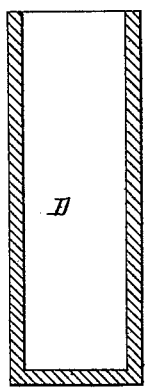

(No Model.) 2 Sheets—Sheet 1.
P. JABLOCHKOFF.
GALVANIC BATTERY.
No. 360,158. Patented Mar. 29, 1887.
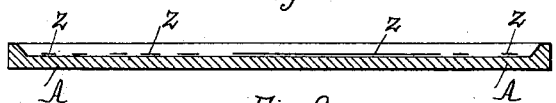
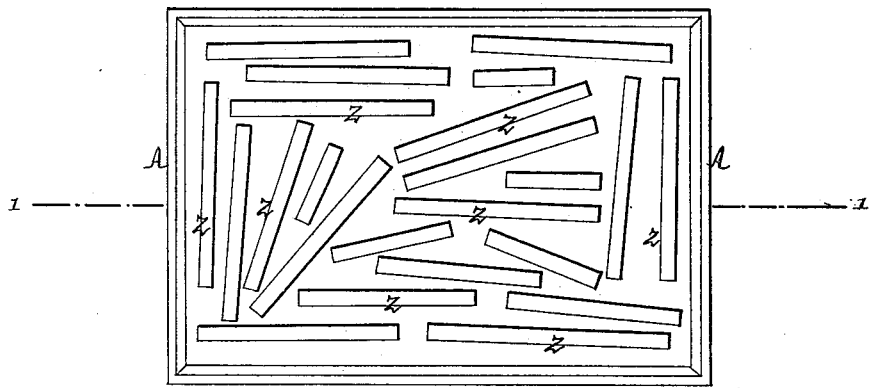
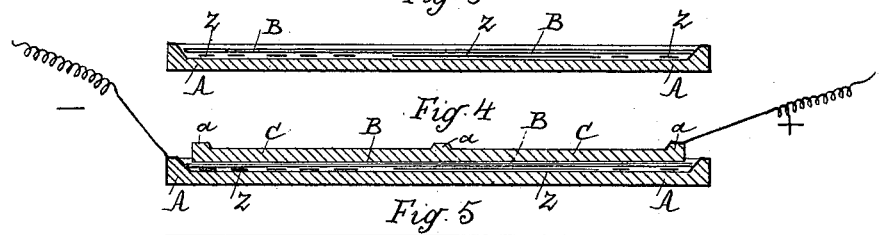
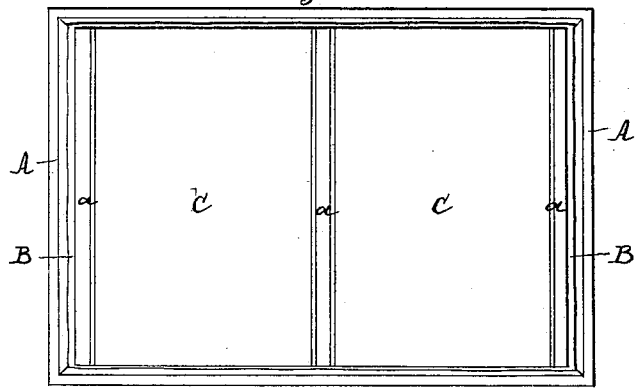
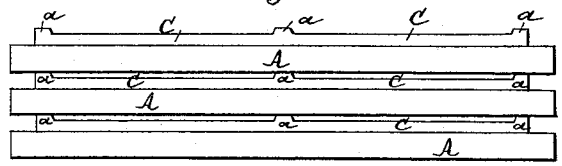
WITNESSES:
Arthur Wilson.
George W. Powell
INVENTOR:
Paul Jablochkoff
By his Attorneys,
Arthur O. Fraser & Co.

(No Model.) 2 Sheets—Sheet 2.

P. JABLOCHKOFF.
GALVANIC BATTERY.

No. 360,158. Patented Mar. 29, 1887.

WITNESSES:
Arthur Wilton.
George W. Powell

INVENTOR:
Paul Jablochkoff.
By his Attorneys,
Arthur C. Fraser & Co.

UNITED STATES PATENT OFFICE.

PAUL JABLOCHKOFF, OF PARIS, FRANCE.

GALVANIC BATTERY.

SPECIFICATION forming part of Letters Patent No. 360,158, dated March 29, 1887.

Application filed November 26, 1886. Serial No. 219,920. (No model.) Patented in France October 20, 1884, No. 164,896; in England October 21, 1884, No. 13,922; in Germany December 25, 1884, No. 32,399; in Belgium May 8, 1885, No. 68,809; in Austria-Hungary May 12, 1885, No. 4,938 and No. 23,978, and in Italy September 15, 1885, XIX, 18,864, XXXVII, 278.

*To all whom it may concern:*

Be it known that I, PAUL JABLOCHKOFF, a subject of the Emperor of Russia, residing in Paris, France, have invented certain new and useful Improvements in Electrical Batteries, of which the following is a specification.

This invention is the subject of a patent in France, No. 164,896, dated October 20, 1884, and of certificates of addition thereto, dated, respectively, March 18, 1885, and August 22, 1885; of a patent in England, No. 13,922, dated October 21, 1884; of a patent in Germany, No. 32,399, dated December 25, 1884; of a patent in Austria-Hungary, dated May 12, 1885, Nos. (Vienna) 4,938 and (Buda-Pesth) 23,978; of a patent in Belgium, dated May 8, 1885, No. 68,809, and of a patent in Italy, dated September 15, 1885, (Reg. Gen. Vol. 19, No. 18,864, Reg. Att. Vol. 37, No. 278.)

This invention provides a new form of electric battery, which I call an "auto-accumulator," and which depends for its operation on the following principles: If we decompose by any metal whatever either a salt, an alkali, or an oxide, the metal on entering into combination causes hydrogen to be set free. If, then, we place beside this metal, or in contact with it, a metal or other suitable substance which is not oxidizable, or is oxidizable to a less degree than the first metal, we have constituted an electric couple, and the hydrogen resulting from the decomposition passes over and accumulates on the least oxidizable metal or other substance. If, in the second place, we place beside this second metal, (or other substance,) or in contact with it, a substance which is a conductor of electricity, and which is capable of absorbing oxygen in its pores, or of accumulating it on its surface, these last two substances constitute between them an electric couple, so that if we join by a conductor the second substance, which is an accumulator of hydrogen, and the substance which is an accumulator of oxygen, we shall generate an electric current as a result of the combination of the hydrogen and oxygen accumulated separately on the two electrodes. My auto-accumulator comprises, then, the combination of three electrodes—namely, as the first electrode an oxidizable metal, as the second electrode an inoxidizable metal, or one less oxidizable than the first, or any non-metallic substance capable of absorbing hydrogen, and as the third electrode a substance which accumulates oxygen. It will be understood that this principle may be applied in various ways and by the use of many different substances as the respective electrodes.

Figure 8:
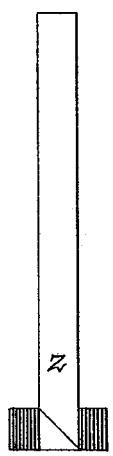
Figure 10:
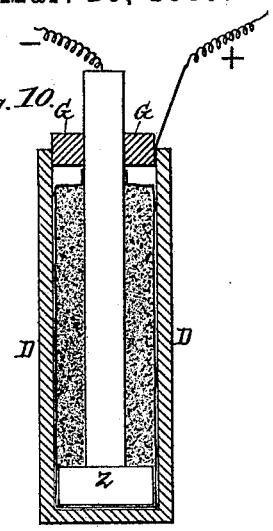
Figure 11:
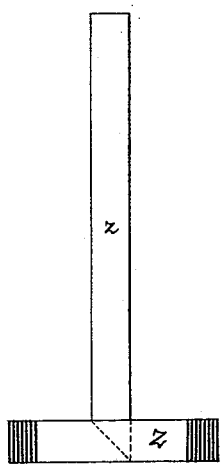
Figure 9:
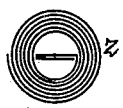
Figure 12:
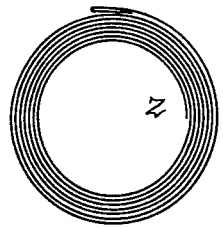
Figure 13:
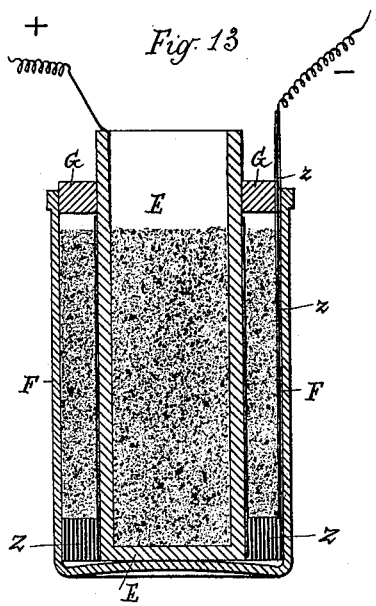

Figures 1 to 6 of the accompanying drawings illustrate one construction of auto-accumulator in accordance with my present invention. Fig. 1 is a longitudinal vertical section cut on the line 1 1 in Fig. 2, which is a plan. Figs. 3 and 4 are sections corresponding to Fig. 1, but showing additional parts, and Fig. 5 is a plan of Fig. 4. Fig. 6 is a side elevation of three superposed couples or sets of elements constituting a complete battery connected for tension. Figs. 7, 8, 9, and 10 show a modified construction. Fig. 7 is a vertical section of the inclosing-cup. Fig. 8 is an elevation of the zinc element partly in section. Fig. 9 is a plan thereof, and Fig. 10 is a vertical section of the battery complete. Figs. 11, 12, and 13 show still another construction embodying my invention. Fig. 11 is an elevation of the zinc element partly in section. Fig. 12 is a plan thereof, and Fig. 13 is a vertical mid-section of the battery complete.

I will first describe the horizontal construction of battery shown in Figs. 1 to 6.

Each element comprises a shallow basin or tray, A, of porous carbon, a plate or series of pieces or strips, Z Z, of zinc, and a carbon plate, C. The basin A is best shown in Figs. 1 and 2. In its hollow are placed the strips or pieces of zinc, (or other suitable metal,) and over these is placed an absorbent sheet of cloth or paper B, (best shown in Fig. 3,) which is saturated with a solution of any chloride—as chloride of lime, for example. On top of this is placed the carbon plate C, as shown in the section, Fig. 4, and in the plan, Fig. 5. This plate C is formed or molded with ribs or projections *a a* on its upper side. After combining several elements in this manner they may be superposed, as shown in Fig. 6, the carbon basin A of each superposed element resting in direct contact with the projections *a a* on the plate C of the next element beneath. The purpose of the projections *a a* is to afford free access of air to the carbon plate C. They also serve to make electrical contact with the basin A, so that when the elements are thus superposed they are coupled in tension. The zinc, which is oxidized, and the carbon basin A constitute a primary couple, and the basin draws to itself the hydrogen, which it stores up. The carbon basin A and the carbon plate C constitute a secondary battery—a veritable gas-battery—the current which it produces in the exterior circuit being the result of the combination of the hydrogen accumulated on A with the oxygen derived from the external atmosphere which is absorbed in the pores of the plate C. This plate becomes the positive pole and the basin the negative pole. In order to augment or facilitate the absorption of oxygen from the air by the carbon plate C, the latter is impregnated with azotic acid, which possesses this absorbent property.

I will now describe the construction of my auto-accumulator battery shown in Figs. 7 to 10.

A cup, D, of porous carbon (shown in Fig. 7) incloses the other elements and constitutes itself the positive pole. This cup is dipped in azotic acid to increase its absorption of oxygen from the external air, and performs the function of the plate C in the preceding figures. In this cup is placed the zinc element Z, (shown in Figs. 8 and 9,) which is made of a strip of sheet-zinc rolled into a spiral, as shown in Fig. 9, with one end bent upwardly and extending above the top of the cup. The zinc rests at the bottom of the cup, from which it is insulated by being inclosed in a bag, B, of linen. In this bag, above the zinc, I place a quantity of crushed carbon moistened with a solution of chloride of lime. The strip of zinc, which emerges at the top from the middle of the carbon cup, constitutes the negative pole. A cork or stopper, G, prevents the air from reaching the negative pole.

I will now describe the form of my auto-accumulator shown in Figs. 11 to 13. In this construction the positive pole consists of a porous vesssl, E, Fig. 13, which contains crushed carbon moistened with azotic acid. This porous-carbon vessel E is placed inside of a cup or vase, F, of glass or earthenware, in which cup, outside of the vessel E, is placed the zinc element Z, which is in the form of an annular spiral coil, as shown in Fig. 12, with one end of the strip turned upwardly, as shown in Fig. 11. The coil of zinc rests at the bottom of the annular space between the vessels E and F, and the upturned strip projects upwardly above the top of the cup F and constitutes the negative pole. The vessel E is inclosed in a porous bag B, which insulates it from the zinc. The annular space between the two vessels and above the coil of zinc is filled with crushed carbon or powdered charcoal moistened with a solution of chloride of lime. A cork or stopper, G, closes the top of the annular chamber between the two vessels, and prevents the exterior air from reaching the negative pole, which would depolarize it. The porous-carbon vessel E, on the contrary, is left open, in order to give free access to the exterior air, in order that its oxygen may be absorbed. The vertical zinc strip, which serves as a conductor, is inclosed in a sheathing of lead, in order to protect it from the action of the chloride.

My invention may be embodied in numerous other forms than those hereinabove described, these modifications being illustrated as examples of effective and desirable arrangements, which may be multiplied and extended indefinitely. In whatever form my invention may be applied, it embodies the association of three electrodes—to wit, an oxidizable metal or substance, a substance having a capacity for storing hydrogen, and a substance having a capacity for absorbing oxygen. A battery thus constructed polarizes itself constantly, and constitutes an electric accumulator, which acts whenever desired by simply establishing a circuit between the electrode which accumulates hydrogen and the one which accumulates oxygen, or between the electrode which accumulates oxygen and the oxidizable metal. The self-regenerative action of my improved battery keeps it in action without failing until the zinc or other oxidizable substance is all consumed, so long as the chloride or other moistening solution is kept supplied.

I claim as my invention my improved electric battery or auto-accumulator, involving the following-defined novel features or combinations, substantially as hereinabove specified, namely:

1. A battery consisting of the combination of an oxidizable metal or other substance, a substance having the property of accumulating hydrogen, and a substance having the property of accumulating oxygen.

2. A battery consisting of the combination of an oxidizable metal or other substance, a substance having the property of accumulating hydrogen, and a substance having the property of accumulating oxygen and constituting the positive pole, while one of the other substances constitutes the negative pole.

3. A battery consisting of an oxidizable metal or other substance, a porous substance having the property of accumulating hydrogen arranged in proximity thereto and adapted to absorb the hydrogen liberated from said metal, and a porous substance having the property of absorbing oxygen arranged to be exposed to the atmosphere.

4. A battery consisting of an oxidizable metal or other substance, an electrode of porous carbon arranged in proximity thereto, where it may absorb the hydrogen liberated therefrom, and an electrode of a substance having the property of accumulating oxygen.

5. A battery consisting of an oxidizable metal or other substance, forming the negative pole, an electrode of crushed carbon arranged in proximity thereto, where it may absorb the hydrogen liberated therefrom, and an electrode of a porous substance having the property of absorbing oxygen, forming the positive pole.

6. A battery consisting of an oxidizable metal or other substance, a solution of chloride of lime or other chloride applied thereto, an electrode of a substance having the property of accumulating hydrogen, and an electrode of a substance having the property of accumulating oxygen.

7. A battery consisting of an oxidizable metal or other substance, a porous substance having the property of accumulating hydrogen and moistened with a chloride solution, and a substance having the property of accumulating oxygen.

8. A battery consisting of an oxidizable metal or other substance, a substance having the property of accumulating hydrogen, and a substance having the property of accumulating oxygen, and which is moistened with azotic acid.

9. A battery consisting of a cup of porous material having the property of absorbing oxygen, an oxidizable metal, and a granular substance having the property of accumulating hydrogen.

10. A battery consisting of a cup of porous material having the property of absorbing oxygen, a quantity of granulated carbon in said cup, and a spirally-coiled strip of zinc.

11. A battery consisting of a cup of porous carbon, a quantity of granulated carbon in said cup, an electrode of oxidizable metal outside of said cup, an outer vessel, and a filling of granulated carbon in the space between said vessel and cup.

12. A battery consisting of a cup of porous carbon, an electrode of oxidizable metal, a filling of granulated carbon against the wall of said cup, and a stopper over said filling of granulated carbon to exclude the air therefrom while giving it free access to the surface of said cup.

13. A battery consisting of a basin of porous carbon, an oxidizable metal placed therein, and a plate of porous carbon placed thereon, with an intervening layer of moistened porous material.

14. A battery consisting of a basin of porous carbon, an oxidizable metal placed therein, a layer of moistened porous material placed thereon, and a plate of porous carbon placed thereupon and formed with projections on its upper surfaces.

15. A battery of tension consisting of a series of superposed electric couples, each consisting of a basin containing an oxidizable metal and a porous oxygen absorbent placed thereon, the basin of each superposed couple being elevated above the upper surface of the absorbent plate on which it is placed, thereby leaving an intervening space for circulation of air.

In witness whereof I have hereunto signed my name in the presence of two subscribing witnesses.

PAUL JABLOCHKOFF.

Witnesses:
ROBT. M. HOOPER,
AMAND RITTER.